United States Patent
Moll

(10) Patent No.: US 10,024,043 B2
(45) Date of Patent: Jul. 17, 2018

(54) WATER POLLUTION TRAP WITH REPLACEABLE FILTRATION BOX FOR TOP-DOWN CLEANING

(71) Applicant: John S. Moll, Suwanee, GA (US)

(72) Inventor: John S. Moll, Suwanee, GA (US)

( * ) Notice: Subject to any disclaimer, the term of this patent is extended or adjusted under 35 U.S.C. 154(b) by 789 days.

(21) Appl. No.: 14/508,019

(22) Filed: Oct. 7, 2014

(65) Prior Publication Data

US 2015/0114893 A1    Apr. 30, 2015

Related U.S. Application Data

(60) Provisional application No. 61/897,454, filed on Oct. 30, 2013.

(51) Int. Cl.
| | |
|---|---|
| *E03F 1/00* | (2006.01) |
| *E03F 5/16* | (2006.01) |
| *E03F 5/04* | (2006.01) |
| *C02F 103/00* | (2006.01) |
| *B01D 29/56* | (2006.01) |

(52) U.S. Cl.
CPC ............. *E03F 5/16* (2013.01); *E03F 5/0404* (2013.01); *B01D 29/56* (2013.01); *B01D 2221/12* (2013.01); *C02F 2103/001* (2013.01); *Y10T 29/4973* (2015.01)

(58) Field of Classification Search
CPC .. E03F 5/0404; E03F 5/16; E03F 5/14; B01D 29/56; B01D 2221/12; B01D 21/0087; C02F 2103/001
USPC ................. 210/170.03, 532.1, 537, 538, 540
See application file for complete search history.

(56) References Cited

U.S. PATENT DOCUMENTS

| | | | |
|---|---|---|---|
| 4,966,718 A | 10/1990 | Johnson | |
| 5,480,254 A | 1/1996 | Autry et al. | |
| 5,507,944 A | 4/1996 | Friedland et al. | |
| 5,569,376 A | 10/1996 | Graves | |
| 5,667,689 A | 9/1997 | Graves | |
| 5,788,849 A * | 8/1998 | Hutter, Jr. ............. | B01D 15/00 |
| | | | 210/163 |
| 5,855,774 A | 1/1999 | Boelter | |

(Continued)

OTHER PUBLICATIONS

CrystalStream Technologies, Brighton Place Basin B, Poway, CA, May 25, 2010, 1 Page.

*Primary Examiner* — Terry K Cecil
(74) *Attorney, Agent, or Firm* — Gardner Groff Greenwald & Villanueva, PC

(57) ABSTRACT

A pollution trap for storm-water runoff includes a filter-box assembly that provides for top-down maintenance. The filter-box assembly includes at least one filter container, a filter-container support, and a peripheral seal, so the filter container can be lifted from and lowered into the trap from above. The filter container includes sidewalls forming an open bottom and top, a bottom filter support, and a top filter retainer, with the container receiving a stack of intelligently-selected filters supported on the filter support and kept in the container by the top filter retainer. An optional adjustable hold-down assembly holds down the top filter retainer and the underlying filters. The filter-container support holds the filter container up off the trap floor so the storm-water can up-flow through it. And the seal is interposed peripherally between the filter container and the filter-container support so the storm-water cannot flow around the filter container.

19 Claims, 11 Drawing Sheets

(56) References Cited

U.S. PATENT DOCUMENTS

| | | | |
|---|---|---|---|
| 6,428,692 B2 | 8/2002 | Happel | |
| 6,797,161 B2 | 9/2004 | Use et al. | |
| 6,936,163 B2 | 8/2005 | Use et al. | |
| 6,939,461 B2 | 9/2005 | Use et al. | |
| 6,951,607 B2 | 10/2005 | Use et al. | |
| 6,994,783 B2 | 2/2006 | Use et al. | |
| 7,011,743 B2 | 3/2006 | Use et al. | |
| 7,037,436 B2 | 5/2006 | Use et al. | |
| 7,083,721 B2 | 8/2006 | McClure et al. | |
| 7,132,045 B1 | 11/2006 | Trangsrud | |
| 7,282,142 B2 | 10/2007 | Kraft | |
| 7,285,211 B2 | 10/2007 | Brody | |
| 7,291,262 B2 * | 11/2007 | Matsui | C02F 1/00 210/170.03 |
| 7,294,256 B2 | 11/2007 | Happel et al. | |
| 7,309,420 B1 | 12/2007 | Trangsrud | |
| 7,670,483 B2 | 3/2010 | Ringenbach et al. | |
| 7,820,040 B2 | 10/2010 | Moll et al. | |
| 7,846,327 B2 | 12/2010 | Happel et al. | |
| 8,017,005 B2 | 9/2011 | Ringenbach et al. | |
| 8,034,234 B2 | 10/2011 | Happel | |
| 8,034,236 B1 | 10/2011 | Happel | |
| 8,038,879 B2 | 10/2011 | Kraft | |
| 8,083,937 B2 | 12/2011 | Happel | |
| 8,221,632 B2 | 7/2012 | Muinnis et al. | |
| 8,231,780 B2 | 7/2012 | Happel | |
| 8,366,923 B1 | 2/2013 | Happel | |
| 8,496,814 B2 | 7/2013 | Kent | |
| 8,608,956 B2 | 12/2013 | Moulton et al. | |
| 8,679,329 B2 | 3/2014 | Vreeland | |
| 2008/0251470 A1 | 10/2008 | Kent | |
| 2011/0278237 A1 | 11/2011 | McInnis | |
| 2012/0031854 A1 | 2/2012 | Allard | |
| 2013/0118963 A1 | 5/2013 | Bailey et al. | |
| 2013/0228527 A1 | 9/2013 | Crasti | |
| 2014/0158596 A1 | 6/2014 | Kent | |

* cited by examiner

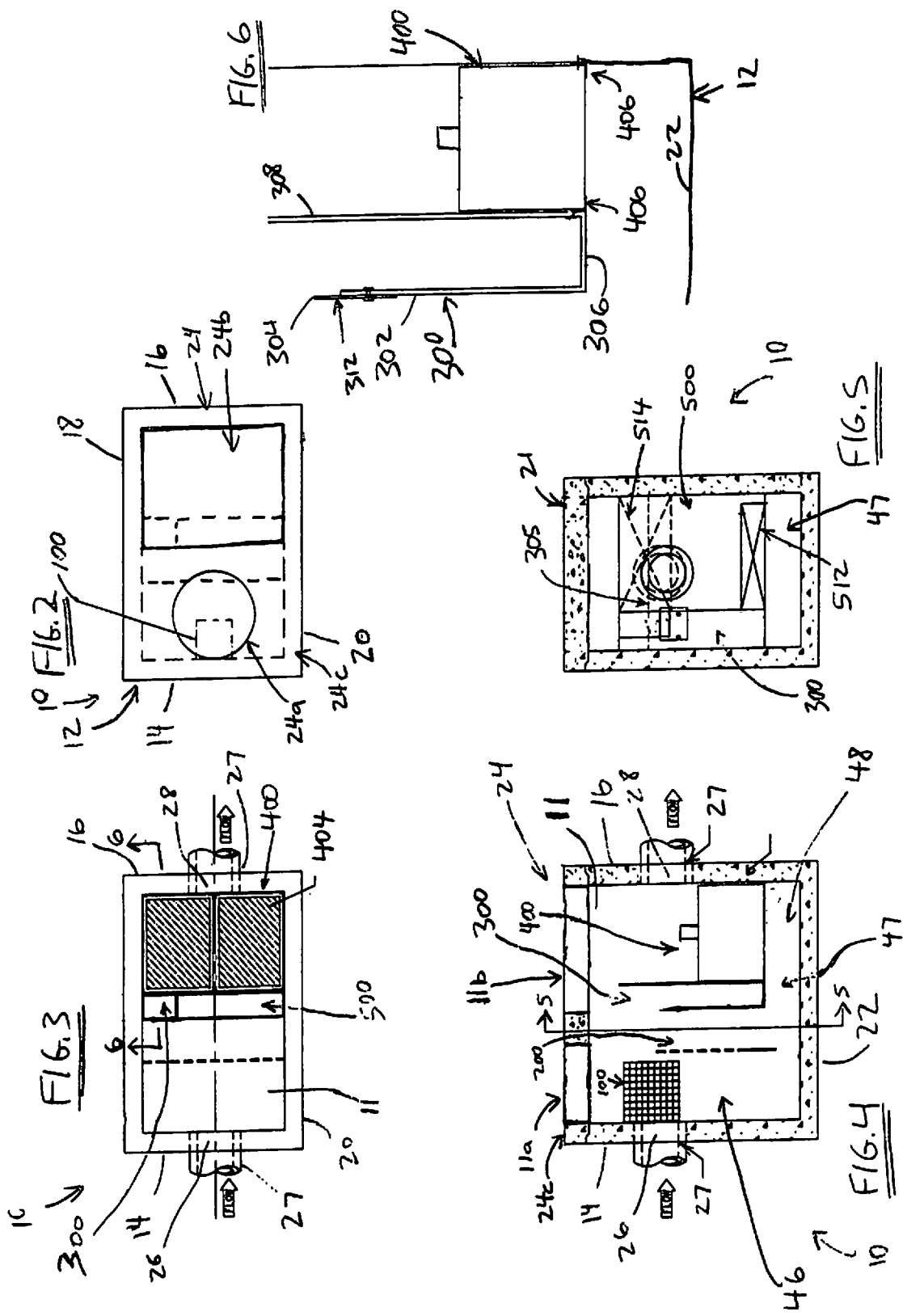

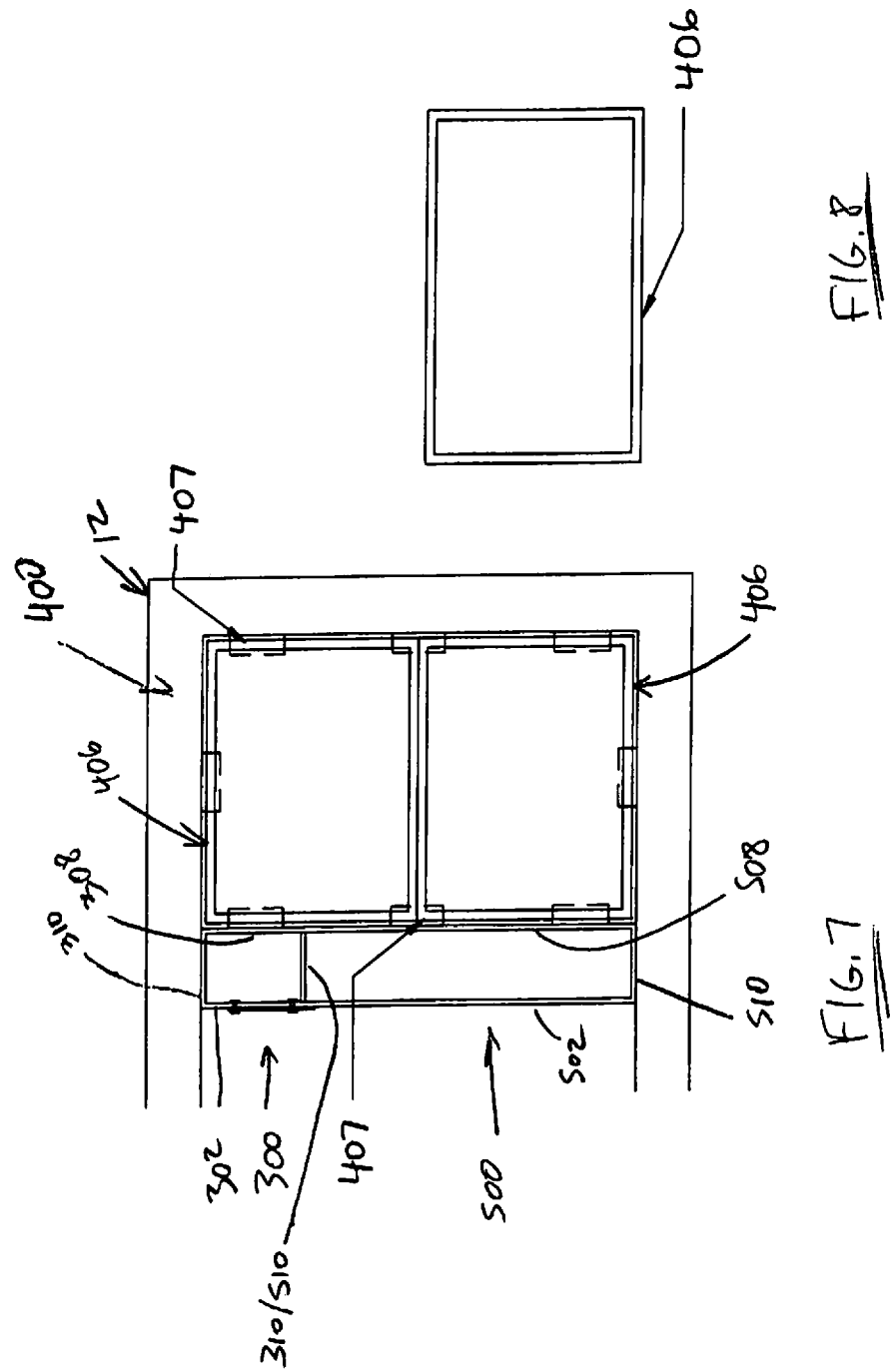

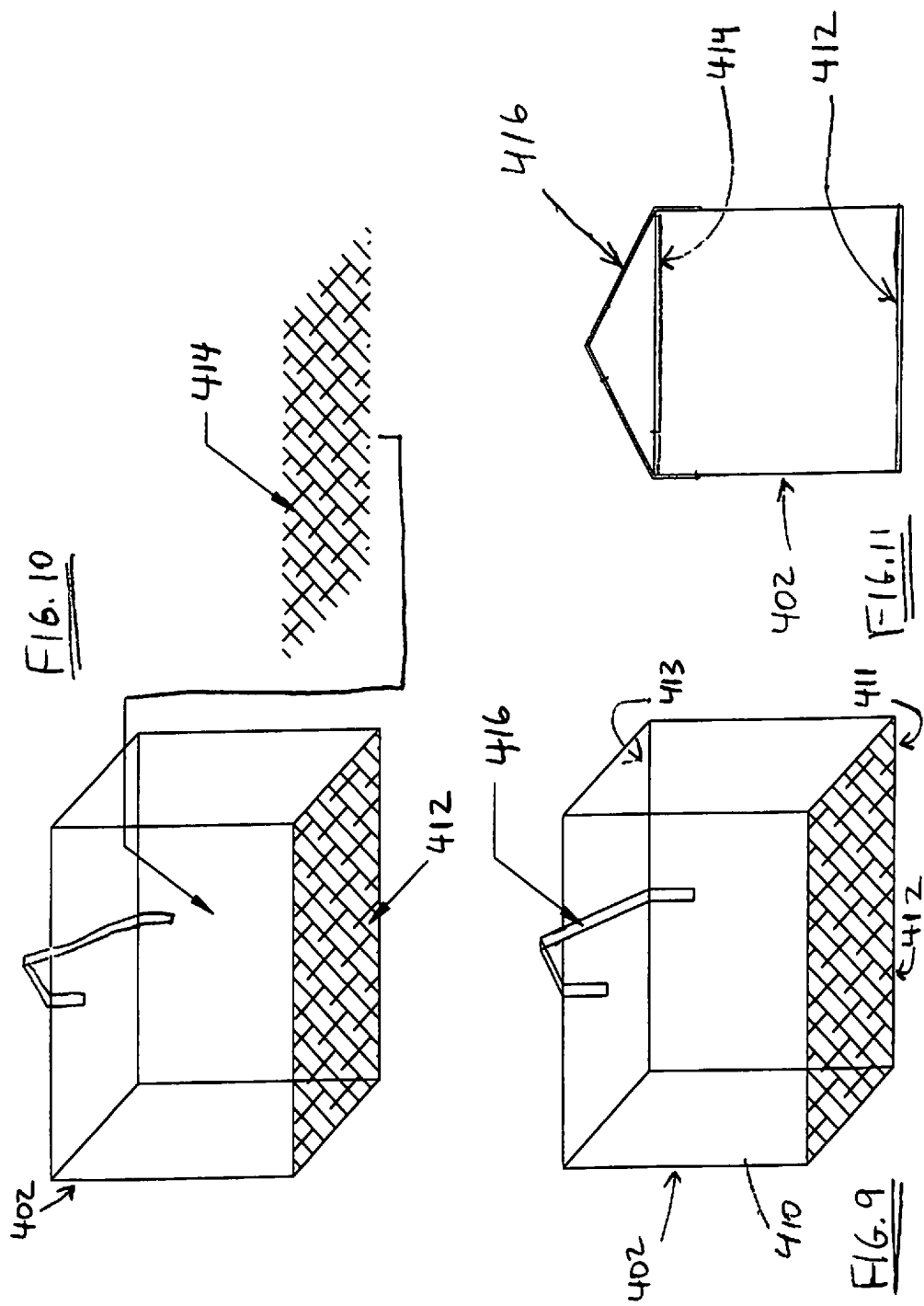

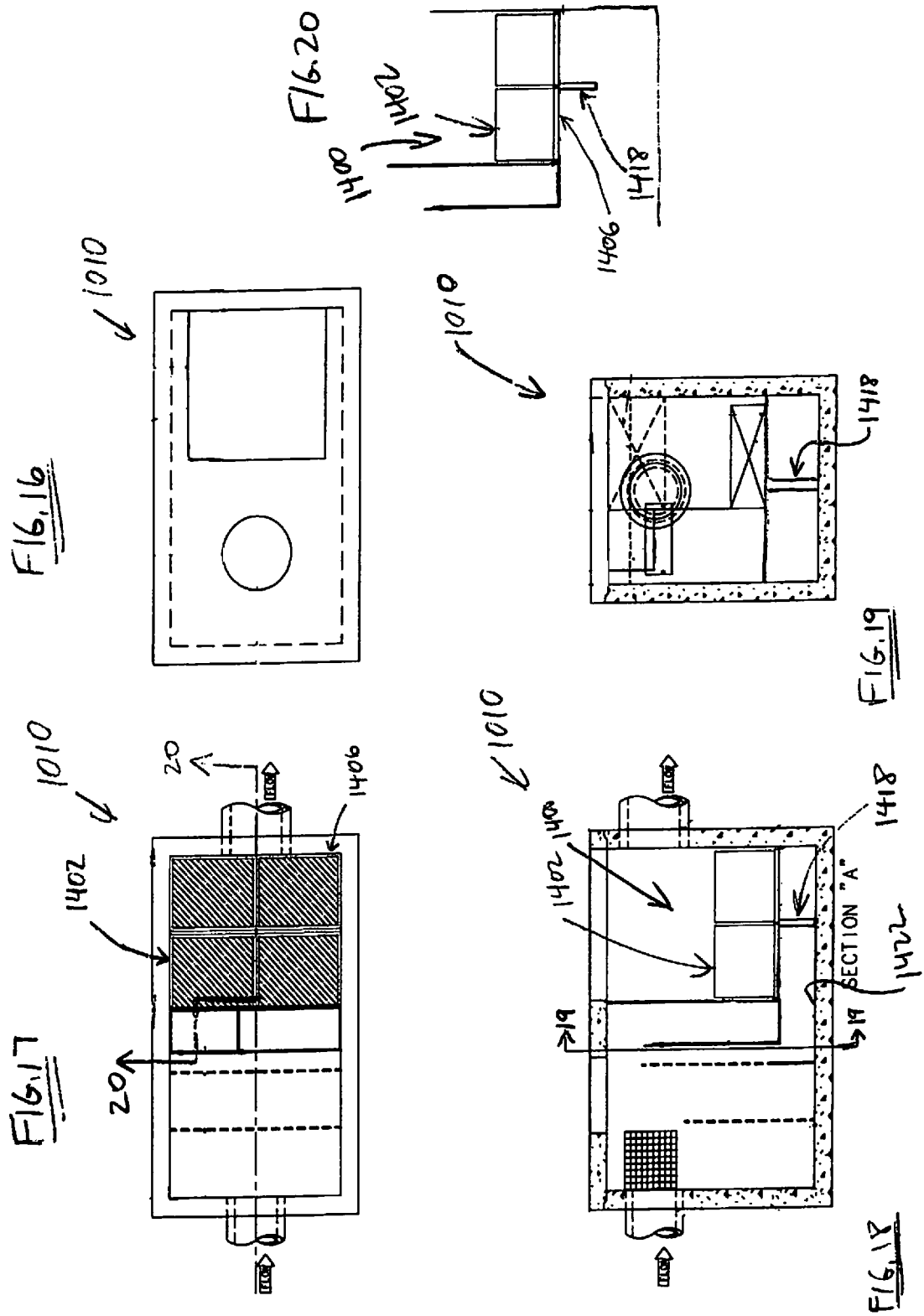

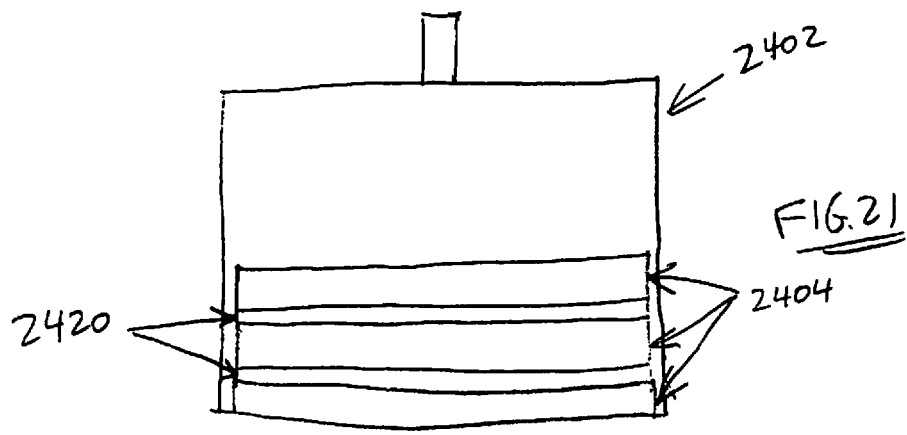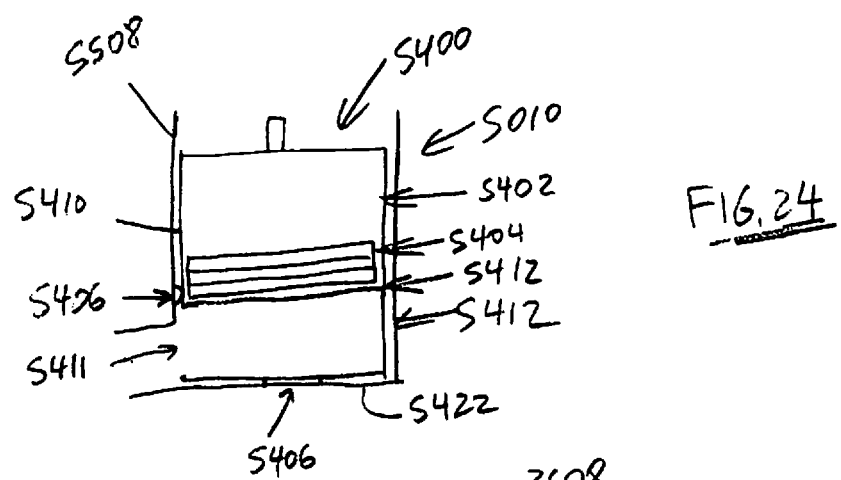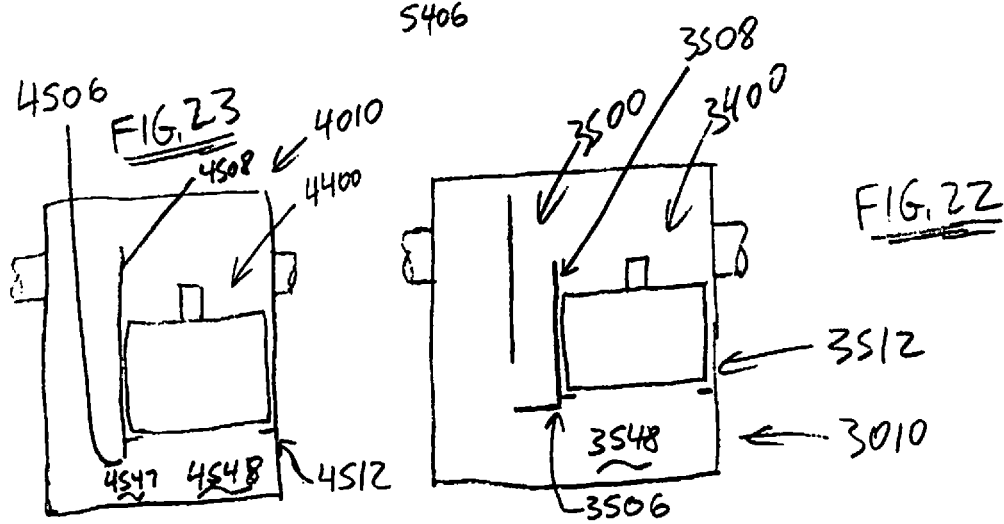

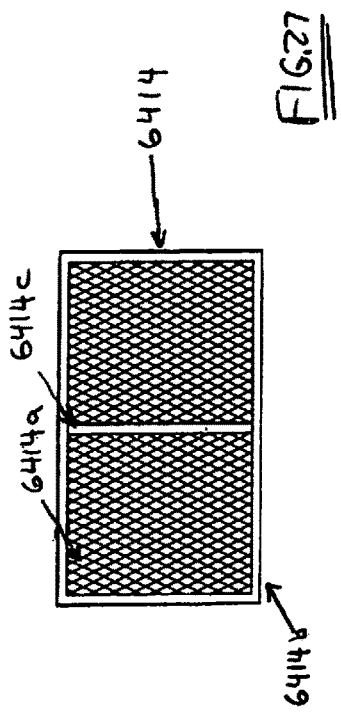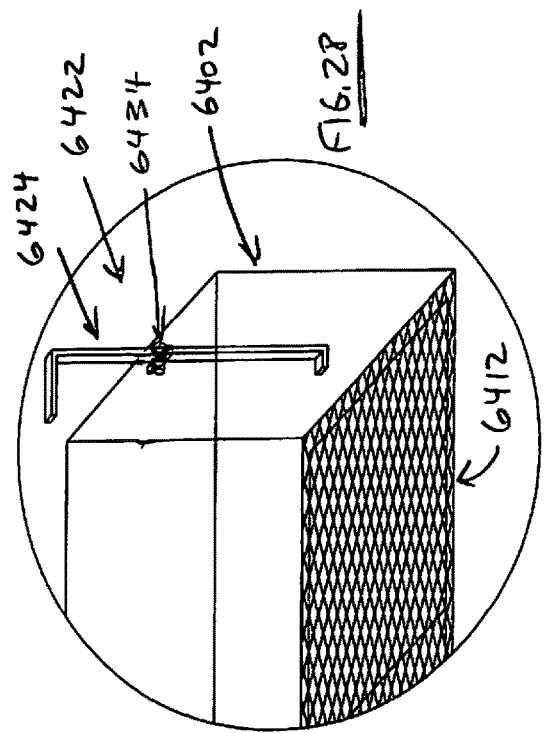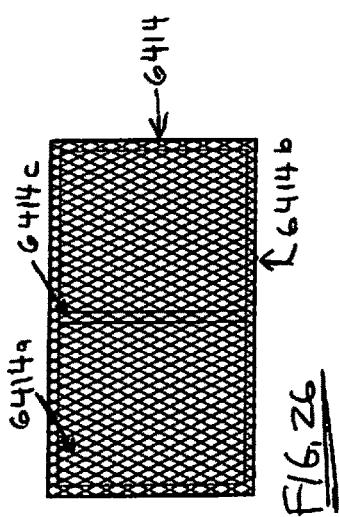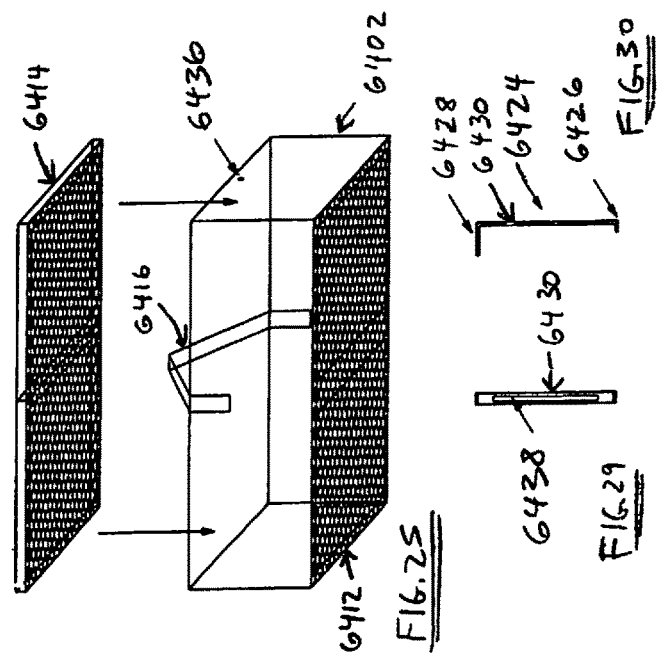

WATER POLLUTION TRAP WITH REPLACEABLE FILTRATION BOX FOR TOP-DOWN CLEANING

CROSS-REFERENCE TO RELATED APPLICATION

This application claims the priority benefit of U.S. Provisional Patent Application Ser. No. 61/897,454, filed Oct. 30, 2013, which is hereby incorporated herein by reference.

TECHNICAL FIELD

The present invention relates generally to water pollution traps, and particularly to such traps with filter media for separating and collecting various pollutants from storm-water runoff.

BACKGROUND

During rainstorms, water that is not absorbed into the ground runs off into storm-sewer systems for delivery into freshwater systems such as streams, rivers, lakes, and wetlands. While flowing across parking lots, landscaped areas, and other surfaces, the storm-water runoff picks up debris and other pollutants and carries them into the storm-sewer systems. Particularly large amounts of pollutants are picked up at shopping centers with large parking lots, oil-change and auto-repair shops, gas stations, and so forth. These pollutants include motor oil and other hydrocarbons, particulate matter such as sand and grit, and miscellaneous debris such as vegetative matter, paper, plastic, and foam cups. For example, about 200 pounds of miscellaneous debris and 500 pounds of sand and grit is commonly carried off by storm-water runoff from some one-acre parking lots in 90 days.

To maintain freshwater systems, most cities and counties have regulations requiring that some of the pollutants be removed from the storm-water runoff before entering their storm-sewer systems. In order to meet these regulations, facilities typically install on-site pollution traps to filter the storm-water runoff. These pollution traps are sometimes referred to as "oil/grit separators."

There have been significant advances related to such pollution traps in recent years. These include the innovations disclosed by U.S. Pat. Nos. 6,797,161; 6,936,163; 6,939,461; 6,951,607; 6,994,783; 7,011,743; and 7,037,436, all of which are incorporated herein by reference. While these advances have improved on many of the deficiencies of prior pollution traps, further advances are desired.

For example, maintaining these pollution traps can be difficult due to the space constraints involved. For example, many of these units include filter media deep within a vault/chamber with a 24-inch manhole access, and the filter media must be replaced periodically. The resulting confined-space entry into the vault to replace the filter media is typically a difficult, time-consuming, and unpleasant process.

Accordingly, it can be seen that a need remains for improvements to pollution traps that permit quicker and easier filter-media replacement. It is to the provision of pollution traps meeting these and other needs that the present invention is primarily directed.

BRIEF DESCRIPTION OF THE DRAWINGS

FIG. 2 is a top view of a complete assembly of the pollution trap of FIG. 1.

FIG. 3 shows the pollution trap of FIG. 2 with its lid removed to reveal its internal components.

FIG. 4 is a side view of the pollution trap of FIG. 2 with one of its sidewalls removed to reveal its internal components.

FIG. 5 is a cross-sectional view of the pollution trap taken at line 5-5 of FIG. 4.

FIG. 6 is a cross-sectional view of a rear portion of the pollution trap taken at line 6-6 of FIG. 3.

FIG. 7 is a top view of a rear portion of the pollution trap of FIG. 1 without any filter media in the filter box for clarity of illustration.

FIG. 8 shows one of the filter supports of the pollution trap portion of FIG. 7 without any filters and without its top filter-retainer for clarity of illustration.

FIG. 9 is a perspective view of one of the filter containers of the pollution trap of FIG. 1 with its top filter retainer removed for clarity of illustration.

FIG. 10 shows the filter container of FIG. 9 with its top filter retainer being installed from its displaced/maintenance position into its constraining/use position.

FIG. 11 is an end view of the filter container of FIG. 10 with the top filter retainer in its use position.

FIG. 16 is a top view of a pollution trap with a filter box assembly according to a second example embodiment of the present invention.

FIG. 17 shows the pollution trap of FIG. 16 with its lid removed to reveal its internal components.

FIG. 18 is a side view of the pollution trap of FIG. 16 with one of its sidewalls removed to reveal its internal components.

FIG. 19 is a cross-sectional view of the pollution trap taken at line 19-19 of FIG. 18.

FIG. 20 is a cross-sectional view of a rear portion of the pollution trap taken at line 20-20 of FIG. 17.

FIG. 21 is a side cross-sectional view of a filter container of a filter box assembly of a pollution trap according to a third example embodiment of the present invention.

FIG. 22 is a side cross-sectional view of a pollution trap with a filter box assembly according to a fourth example embodiment of the present invention.

FIG. 23 is a side cross-sectional view of a pollution trap with a filter box assembly according to a fifth example embodiment of the present invention.

FIG. 24 is a side cross-sectional view of a rear portion of a pollution trap with a filter box assembly according to a sixth example embodiment of the present invention.

FIG. 25 is a perspective view of a filter container of a filter box assembly of a pollution trap according to a seventh example embodiment of the present invention, showing its top filter retainer being installed from its displaced/maintenance position into its constraining/use position.

FIG. 26 is a bottom view of a filter retainer of the filter container of FIG. 25.

FIG. 27 is a top view of a filter retainer of the filter container of FIG. 25.

FIG. 28 is a perspective view of a portion of the filter container of FIG. 25, showing an adjustable hold-down assembly.

FIG. 29 is a front end view of a hold-down member of the hold-down assembly of FIG. 28.

FIG. 30 is a side view the hold-down assembly of FIG. 29.

SUMMARY

Figure 1:
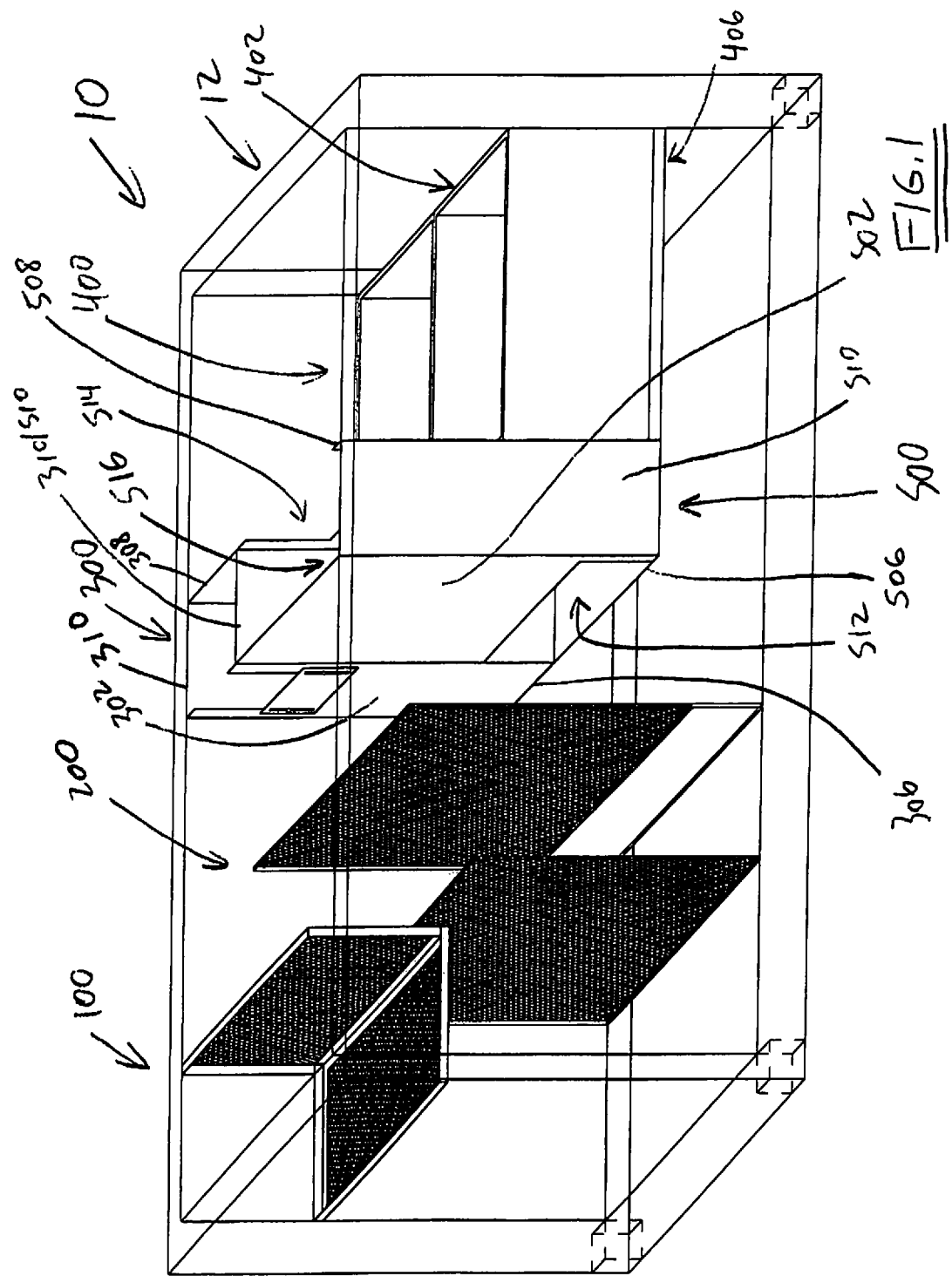
FIG. 1 is a perspective view of a pollution trap with a filter box assembly according to a first example embodiment of the present invention, shown without its lid, inlet, outlet, or filter-box handles for clarity of illustration.

Generally described, the present invention relates to pollution traps for storm-water runoff. In example embodiments, the pollution trap includes a filter-box assembly that provides for top-down maintenance. The filter-box assembly includes at least one filter container, a filter-container support, and a peripheral seal. The filter container includes sidewalls forming an open bottom and top, a lifting/lowering handle, a bottom filter support, and a top filter retainer positionable between constraining and displaced positions, with the container receiving a stack of intelligently-selected filters supported on the filter support and kept in the container by the top filter retainer in the constraining position. The filter-container support holds the filter container up off the trap floor so the storm-water can up-flow through it. And the seal is interposed peripherally between the filter container and the filter-container support so the storm-water cannot flow around the filter container. In this way, the filter container can be lifted from the trap from above ground, the filters can be replaced, and the renewed filter container lowered back into the trap from above ground.

An optional adjustable hold-down assembly holds down the top filter retainer and the underlying filters. Other embodiments include a variety of different bottom filter supports, top filter retainers, curtain-wall structures forming a sub-chamber for the filter containers, as well as different hold-down members of the optional adjustable hold-down assembly. In another aspect of the invention, there is provided a method of top-down cleaning using such pollution traps and filter-box assemblies.

The specific techniques and structures employed to improve over the drawbacks of the prior devices and accomplish the advantages described herein will become apparent from the following detailed description of example embodiments and the appended drawings and claims.

DETAILED DESCRIPTION OF EXAMPLE EMBODIMENTS

Referring now to the drawing figures, wherein like reference numerals represent like parts throughout the several views, the pollution trap of the present invention provides for separating pollutants from storm-water runoff and retaining the pollutants in the trap or a nearby storage container for later removal and disposal. The pollution trap is well suited for filtering pollutants including floatable matter such as motor oil, other hydrocarbons, and detergents, particulate matter such as sand, dirt, and grit, and miscellaneous debris such as vegetative matter from trees, shrubberies, etc., paper and plastic trash, aluminum foil wrappers, foam cups, and so forth. In addition, a person of ordinary skill in the art could adapt the pollution trap described herein in order to separate other types of pollution or other types of matter from liquids other than storm water, if so desired.

FIGS. 1-15 show a pollution trap 10 with a filter box 400 according to a first example embodiment of the present invention. Referring particularly to FIGS. 1-7, the pollution trap 10 includes a chamber (i.e., a vault) 12 that houses a screen 100, one or more baffles 200, a collection reservoir 300, the filter-box assembly 400, and a filter-box bypass 500. In a typical commercial embodiment, the screen 100 is positioned adjacent an inlet to the chamber 12, the baffles 200 are positioned between the screen and an outlet to the chamber, the collection reservoir 300 is positioned between the baffles and the outlet, the filter-box bypass 500 is positioned lateral and connected to the collection reservoir, and the filter box 400 is positioned between the collection reservoir/overflow bypass and the outlet. It will be understood that, while in the depicted embodiment the pollution trap 10 includes all four of the separation stages 100-400 and the filter-box bypass 500, in alternative embodiments the pollution trap can be provided with the filter box by itself in the chamber (i.e., with no additional separation stages), with only one stage (any of those disclosed herein and or another), or with some other combination of stages (any of those disclosed herein and or another) in the depicted or other configurations and positions.

In the depicted embodiment, the chamber 12 is rectangular and formed by end walls 14 and 16, sidewalls 18 and 20, a floor 22, and a lid 24. The chamber end walls 14 and 16, side walls 18 and 20, and floor 22 are made of reinforced concrete and optionally sealed with a coating such as a bituminous material for making the chamber watertight. The lid 24 covers the open top 11 of the chamber 12, and can be at least partially removable in order to provide ready access to the inside of the chamber for maintenance of the trap 10. For example, the lid 24 can include a front manhole hatch 11a and cover 24a (e.g., made of steel) and a rear manhole hatch 11b and cover 24b (e.g., made of steel) supported by a concrete slab 24c, as depicted. Typically, the rear manhole cover 24b is sized and shaped to cover a rectangular access-hatch opening 11b positioned directly above the filter-box assembly 400 and sized and shaped to receive the filter box straight down and up through it (as depicted in FIGS. 2-4). Alternatively, the lid can be made of three steel panels, with a fixed middle panel and two end panels pivotally coupled to the middle one so that in pivoted open positions they form two end access-hatch openings 11a and 11b. In any case, the chamber 12 has a top access opening (an open top, a hatch in a lid, or the like) through which it can be serviced. In addition, when the chamber 12 is installed in a location where it is driven over, its lid and walls can be sized and/or reinforced to withstand the traffic loadings they are subjected to.

In other embodiments, the lid and the chamber walls are made in other regular or irregular shapes and configurations, and are made of other strong and durable materials, as may be desirable in a given application. For example, the chamber walls can be made of fiberglass, hard plastic, or a composite, and/or the chamber can be generally L-shaped, T-shaped, or generally triangular, with two inlets and one outlet. In any case, the chamber walls are rigid and structural to define a fixed-volume internal chamber for the filter stages and for storm-water flow-through. The chamber walls of the depicted embodiments are structurally suitable for installing the trap 10 below grade, as is the typical installation, though the trap in same applications can be installed above ground and for such applications the walls can be made less strong.

In addition, the chamber 12 has an inlet opening 26 in one of the end walls 14 through which the water flows into the chamber and an outlet opening 28 in the other end wall 16 through which the water flows out. The inlet 26 and the outlet 28 are sized and shaped to connect to the pipes 27 of conventional storm-sewer systems. If desired, the inlet 26 and the outlet 28 can include stub-outs for connecting to the conventional storm-sewer pipes 27. The inlet and outlet stub-outs can be provided by, for example, sections of metal or PVC pipe. The inlet 26 and the outlet 28 are sized to handle a predetermined maximum flow rate based on the tributary area to be drained and the worst-storm event the trap 10 is intended to handle. For example, the maximum flow rate can be based on the 25-year storm (the worst storm over a 25-year period for the geographic location, on average), or for an otherwise-defined catastrophic or larger-than-normal storm. Of course, during most storms, the inlet 26 and the outlet 28 do not see anywhere close to the water flow intensity of the 25-year storm.

In a typical commercial embodiment, the outer dimensions of the chamber 12 are seven feet high (higher when stacking a riser section on the depicted chamber section), five feet wide, and seven feet long, with six-inch thick peripheral walls 14, 16, 18, and 20. And the inlet 26 and the outlet 28 are twelve-inch openings positioned about four feet above the chamber floor, with the bottom of the outlet positioned about one-tenth foot lower than the bottom of the inlet. It will be understood that many variations of these dimensions may be used, depending on the size, grade, ground covering, and use of the tributary area to be drained, the typical and maximum rainfall during the design worst-storm event, the local restrictions on flow rates, any physical space limitations for the pollution trap, and so forth. In any event, the chamber 12 is designed so that all of the water that can be delivered into it from the inlet 26 can pass through it and out of the outlet 28.

It will be appreciated that these dimensions are provided to illustrate one example of many possible embodiments of the invention. Thus, these dimensions are representative and not limiting of the invention, unless expressly stated otherwise herein. That is, the scope of the inventions is not limited to any particular dimensions of the chamber 12 and its inlet 26 and outlet 28.

Details of example embodiments of the screen 100, the baffles 200, and the collection reservoir 300, as well as additional details of example embodiments of the chamber 12, are disclosed in co-owned U.S. Pat. Nos. 6,797,161; 6,936,163; 6,939,461; 6,951,607; 6,994,783; 7,011,743; and 7,037,436, all of which are incorporated herein by reference as noted above. So details of the structure and function of these features of the pollution trap 10 will not be repeated to avoid redundancy. Generally speaking, though, in typical embodiments the screen 100 includes a mesh basket and the baffles 200 include perforated panels.

In those prior-disclosed example embodiments, the collection reservoir extends laterally all the way across the chamber between its sides, and is positioned above the chamber bottom wall 22 to define a bottom-flow gap 47. But in the depicted embodiment, the collection reservoir 300 extends laterally only part of the way across the chamber 12 between its sides 18 and 20. And the filter-box bypass 500 is positioned lateral and connected to the collection reservoir 300, extends the rest of the way across the chamber, and is also positioned above the chamber bottom/floor wall 22 to cooperatively define the bottom-flow gap 47. So the collection reservoir 300 and the filter-box bypass 500 collectively extend laterally all of the way across the chamber 12 between its sides 18 and 20, collectively divide the chamber into a front sub-chamber 46 and a rear sub-chamber 48, and collectively define the top of the bottom-flow gap 47. The collection reservoir 300 can extend about ¼ of the way across the chamber 12, with the filter-box bypass 500 extending the remaining about ¾ of the way across, as depicted, or the ratio can be selected otherwise for the site conditions.

In the depicted embodiment, the rear walls 308 and 508 of the collection reservoir 300 and the filter-box bypass 500 collectively define a curtain (flow-blocking) wall 308/508 that cooperates with the chamber rear wall 16 (and the chamber sidewalls 18 and 20) to define the rear sub-chamber 48. And the bottom of the curtain wall 308/508 (including for example the bottom walls 306 and 506 of the collection reservoir 300 and the filter-box bypass 500 collectively) defines a gap edge (e.g., an edge of a generally vertical wall, a generally horizontal wall, or a portion thereof) 306/506 that cooperates with the chamber floor wall 22 (and the chamber sidewalls 18 and 20) to define the bottom-flow gap 47. In this way, the water cannot flow around the sides of the collection reservoir 300 and the filter-box bypass 500, and instead it flows under them through the bottom-flow gap 47 from the front sub-chamber 46 to the rear sub-chamber 48. The bottom walls 306 and 506 of the collection reservoir 300 and the filter-box bypass 500 can be co-planar such that the gap edge 306/506 is a straight line, as depicted, or they can be at different elevations to provide the desired functionality of each assembly while still maintaining the desired size of the bottom-flow gap. Similarly, the rear walls 308 and 508 of the collection reservoir 300 and the filter-box bypass 500 can be co-planar such that the curtain wall 308/508 is planar, as depicted, or they can be in different planes to provide the desired functionality for each assembly while still maintaining the desired size of the rear sub-chamber.

The sub-chambers 46 and 48 provide pools with sufficient depths to encourage settling of the particulate matter, and are in fluid communication through the bottom-flow gap 47. The rear sub-chamber 48 typically has a cross-sectional area (in a plane perpendicular to the water flow, so typically in a generally horizontal plane) larger than that (a cross-sectional area in a plane perpendicular to the water flow, so typically in a generally vertical plane) of the inlet so that the water flows slower through it. In this way, the particulate matter flows rearward through the bottom-flow gap 47 (under the collection reservoir 300 and the filter-box bypass 500), then back up through the filter-box assembly 400 and the rear sub-chamber 48, then rearward out of the chamber 12 through the outlet 28. Because of this longer flow route, because the water is flowing slower, and because of the gravitational forces on the particulate matter as the water decelerates up through the rear sub-chamber 48 to get out of the chamber 12, more of the particulate matter settles to the chamber floor 22 instead of flowing out of the trap 10. And the particulate matter that does not settle to the chamber floor 22 and instead remains in the flow is then separated by the filter-box assembly 400. In order to keep the water from flowing any faster than when it entered the chamber 12, the cross-sectional area (in a plane perpendicular to the water flow, so typically in a generally vertical plane) of the bottom-flow gap 47 can be the same as or larger than that of the inlet 26. Preferably, the water is slowed by sizing the cross-sectional area of the bottom-flow gap 47 larger than the cross-sectional area of the inlet 26, for example, by a factor of about three to five. By keeping the flow rate relatively slow, more of the particulate matter will settle in the chamber 12.

For example, for typical inlet 26 and chamber 12 sizes, the gap edge 306/506 can be positioned about 1.0 foot to about 1.5 feet above the chamber floor 20 so that the cross-sectional area of the bottom-flow gap 47 is three to five times larger than that of the chamber inlet. And the curtain wall 308/508 can be positioned from the chamber rear wall 16 a distance such that the cross-sectional area (in the plane perpendicular to the water flow; i.e., in the generally horizontal plane) of the rear sub-chamber 48 is about eight to ten times larger than that of the chamber inlet 26. In this configuration, the water flow rate through the trap 10 is kept under about 1.0 feet per second even during the maximum storm event, which is slow enough to enable the trap to collect about 2.0 inches of particulate matter in typical installations. In other embodiments, the bottom-flow gap and the rear sub-chamber can be configured in other sizes and shapes selected for the site conditions.

Some basic details of the collection reservoir 300 will now be described. The collection reservoir 300 has a front wall 302 and a skimming edge 304 positioned at the worst storm water level 305, or at a selected storm water level for a lesser storm event, to allow oil collection at that selected level. The skimming edge 304 skims into the reservoir 300 at least some of the oil and/or other pollution floating on the surface of the water. So instead of the floating matter flowing through and out of the chamber 12 on the water surface, it is skimmed into the reservoir 300 and thereby segregated from the water. After the floating matter has been skimmed or drained into the collection reservoir 300, it can be held there or drained out of the chamber 12 through a lateral drain pipe.

In the depicted embodiment, the collection reservoir 300 is formed by the front wall 302, a rear wall 308, two sidewalls 310, and the bottom wall 306 extending between these four peripheral walls, to collectively form a rectangular metal box that is mounted to the chamber sidewalls 18 and 20. In other embodiments, the collection reservoir can be provided in other regular or irregular shapes, configurations, and materials. For standardized traps, the skimming edge 304 can be defined on the front wall 302 or another component of the reservoir 300. To provide for adjustability for site-specific conditions, however, the skimming edge 304 can be defined by the top of a weir member 312 that is adjustably mounted to the front wall 302 or another part of the reservoir 300, as depicted.

Before proceeding with details of the filter box 400, details of the filter-box bypass 500 will now be described. The filter-box bypass 500 includes a lower front inlet 512, an upper rear outlet 514, and a generally vertical bypass passageway 516 extending between the inlet and the outlet. The lower front inlet 512 is positioned below the chamber outlet 28. And the upper rear outlet 514 is positioned above the lower front inlet, with its bottom above the bottom of the chamber outlet 28 and above the filter box 400. In this way, in worst-storm events, the water level in the bypass passageway 506 rises to the upper rear bypass outlet 514, flows through it, and flows out of the chamber outlet 28, bypassing the filter box 400. All of the water can pass through the chamber 12 even during worst-storm conditions, but the internal bypass is included to provide flow relief for the use of certain filter media that have limited flow-through capacity. This limited flow-through capacity can simply be due to permittivity, or it can be dictated by the contact time necessary to treat the water for a particular filter medium.

In the depicted embodiment, the filter-box bypass 500 is formed by a front wall 502, a rear wall 508, two sidewalls 510, and a bottom wall 506 extending between these four peripheral walls, to collectively form a rectangular metal box that is mounted to the chamber sidewalls 18 and 20. The lower front inlet 512 is formed in a lower portion of the front wall 502, the upper rear outlet 514 is formed in an upper portion of the rear wall 508, and the bypass passageway 516 is formed by the front, rear, and side walls. The inner side wall 510 of the filter-box bypass 500 and the inner wall of the collection reservoir 300 can be provided by a single wall member (as depicted) or they can be two separate wall members. In other embodiments, the filter-box bypass can be provided in other regular or irregular shapes, configurations, and materials, for example including an upright (e.g., generally vertical) pipe, a manifold, a chute, or a periscope-like structure.

Referring additionally to FIGS. 8-12, details of the filter box assembly 400 will now be described. The filter box assembly 400 includes at least one container 402 for at least one and typically a plurality of filters (i.e., filter media) 404, a support 406 for the filter container(s), and a seal 408 between the filter container(s) and the container support. In some embodiments the filter box assembly 400 includes multiple filter containers 402 and in other it includes only one—for convenience it will be described herein with reference to one filter container. The filter container 402 is configured and positioned for up-flow through it to enable the water to flow from the bottom-flow gap 47, into the rear sub-chamber 48, up through the container and the filters 404, then out of the chamber outlet 28 (see FIG. 12). The container support 406 is mounted to one or all of the chamber rear wall 16, the chamber side walls 18 and 20, and the curtain wall 308/508, to support the filter container 402 in place in a use position (see FIGS. 1 and 3-6) with its bottom a pre-determined distance above the chamber floor 22 (e.g., one to two feet) to allow space for pollutant settling without impeding water flow. And the seal 408 between the filter container 402 and the container support 406 prevents the water from flowing around the filter container (instead forcing it through it) and bypassing the filters 404. In this way, the water flowing through the trap 10 is forced upward through the filter container 402 so that it flows up across the filters, decelerates, and has an increased residence time in the chamber 12, collectively providing for an increased separation efficiency of the trap.

In typical embodiments, the filter container 402 has a peripheral sidewall defining an open top and bottom. For example, in the depicted embodiment, the filter container 402 includes four sidewalls 410 forming a rectangular box with an open bottom 411 and top 413, with the sidewalls 410 made of metal or another strong and durable material such as hard plastic. The open bottom 411 and top 413 enable the water to flow upwardly through the filter container 402. In typical commercial embodiments, the filter container 402 is provided in a range of sizes for use in a range of sizes of chambers 12, such as 2'×2', 2'×2.5', 2.5'×2.5', 2.5'×3', 2'×3', and 3'×3' feet filter containers (using nominal 2', 2.5', and 3'-long sidewalls), with a height of about 1' (not shown to scale in the drawings). In such embodiments, for example, the 2'×3' and the 2'×2.5' filter containers 402 can be oriented in a rear sub-chamber 48 having a 4' across internal dimension and a 5' or 6' front-to-back/length internal dimension (with the 2' sidewall co-planar with the flow line), or they can be oriented with the 2' sidewall perpendicular to the flow line in other-sized rear sub-chambers, to provide great versatility in configuring the trap 10 for specific applications. The filter container 402 and rear sub-chamber 48 are sized and shaped in a conforming manner to force the water to up-flow through the filter container, and the rear sub-chamber size can be easily sized accordingly by selectively positioning the curtain wall 308/508. In other embodiments, the filter container is provided in another size and in another regular and irregular shape configured to fit the chamber with a seal to provide the up-flow of water through it (e.g., polygonal or circular/tubular, with a non-uniformly shaped seal to provide the up-flow functionality described herein). Typically, due to the overly large size and weight of using a single filter container 402 for each chamber 12, multiple smaller-sized filter containers are provided for each chamber 12, for example in the depicted embodiment there are two filter containers arranged side-by-side in the chamber.

To hold the filters 404 and still permit the upward flow, the filter container 402 can include a bottom filter support 412 and a top filter retainer 414 positioned above it, with the filters 404 sandwiched (or otherwise retained) between them, and with at least one of them being movable from a constraining position to a displaced position for replacing the filters 404. The bottom filter support 412 supports the bottom-most filter 404 in place within the filter container 402 to keep it from falling downward toward the chamber floor 22. And the top filter retainer 414 retains the top-most filter in place within the filter container 402 to keep it from floating upward and out of its flat position (if a filter is sized for horizontal positioning and floats into a position in which it is more than insignificantly angled from horizontal, then the water could flow around it), including possibly floating up out of the container. The bottom filter support 412 and the top filter retainer 414 define flow-through openings to permit the water to flow up past them. For example, the bottom filter support 412 and the top filter retainer 414 can be provided by mesh (e.g., screen or grate such as ¾" aluminum mesh lining) cover panels, as depicted, with the bottom cover panel fixedly mounted to the filter container 402, with the top cover panel receivable within or atop (in the constraining position of for example FIG. 11 or 12), and removable from (in the displaced position of for example FIG. 10), the filter container, and with the mesh structure of each of the cover panels defining the flow-through openings.

In other embodiments, the bottom filter support is in the form of a plurality of lower fixed tabs (e.g., fixed arms, brackets, rods, or other projections), or a lower fixed peripheral frame (e.g., flat metal pieces forming a lip that supports the filters from below), extending inwardly from a lower portion of the filter container (and thus not covering the entire container bottom opening, thereby defining a lower flow-through opening) for supporting the filters. And the top filter retainer is in the form of a plurality of upper movable tabs (e.g., movable arms, brackets, rods, or other projections), or an upper movable peripheral frame (e.g., flat metal pieces forming a lip that retains the filters from above), extending inwardly from an upper portion of the filter container (and thus not covering the entire container top opening, thereby defining an upper flow-through opening) for retaining the filters from floating up out of position, with the movable tabs or frame movable for example by pivoting horizontally or vertically, sliding horizontally, or otherwise moving between constraining positions (blocking the filters from floating up past them) and displaced positions (not blocking the filters from floating up past them). These alternative embodiments of the bottom filter support and the top filter retainer are generally suitable for use with filters having a structural element and generally less suitable for use with filters that are a flexible filter media alone without integral structural support.

Typically, the bottom filter support 412 is permanently mounted to the filter-container sidewalls 410 for example by welds or brackets, and the top filter retainer 414 is movably mounted in place to the sidewalls by conventional mounting hardware for example clips, screws, or an adhesive. The top filter retainer 414 can be mounted at the top edge of the filter container 402 (see FIG. 11), or below the top of the filter container but still above the bottom filter support 412 (see, e.g., FIG. 12). In addition, the filter container 402 can be oversized vertically (but not horizontally), as depicted, to enable use in a typical application (though this can permit some floating of the filters when the top filter retainer 414 is mounted at the top edge of the filter container) and to also enable use with thicker and/or more filters 404 than is typical for special site conditions. In other embodiments, the top filter retainer is movably mounted to the filter container by being weighted sufficiently that it does not float and instead simply rests atop the filters, though mounting the top filter retainer to the filter container for support is typically desired to avoid the weight of the top filter retainer compressing the filters, though this is not an issue with filters that include an integral structural element. For example, the top filter retainer can include a mesh cover panel, a peripheral frame, or both, with weights positioned around its periphery. Or the top filter retainer can simply include a plurality of weights that rest freely on the top-most filter and are positioned around its periphery (above the filter-container support 406).

In addition, the filter container 402 includes a handle 416 for lifting the filter-holding container up out of the chamber 12 during maintenance to replace the filters 404. In this way, the filter-holding container 402 can be removed and replaced from above by a maintenance person at ground level without having to physically enter the chamber 12, except to reach an arm into the chamber to grasp the handle 416 (for manual removal and replacement) or to attach a line to the handle 416 (for mechanical removal and replacement). As such, the filter container 402 with the handle 416 provides for top-down cleaning during maintenance of the trap 10. The handle 416 can be provided by a metal strap (e.g., 1"×0.25" bar stock) mounted to two of the sidewalls 410 and extending across the top of the filter container 402 at about its middle, as depicted. In other embodiments, the handle is provided by another conventional handle, such as two straps mounted to and extending upward from two of the sidewalls at their ends, two vertical rods or bars mounted to and extending upward from two of the sidewalls, two holes in two of the sidewalls that removably receive hooked rods during removal and replacement, or two hooks or eyelets mounted to two of the sidewalls for receiving hooked rods during removal and replacement.

In the depicted embodiment, the container support 406 is provided by a peripheral frame mounted to and extending generally horizontally inward from the chamber rear wall 16, the chamber side walls 18 and 20, and the curtain wall 308/508 (or the gap edge 306/506) to form a lip that supports the filter container 402 in place above the chamber floor 22. The peripheral frame can be in the form of metal angle pieces (for example 2"×2" angle with a ⅛-inch thickness)

supported by and mounted in place by mounts 407 (for example metal L-clips, 2"×2" metal angle pieces with a ⅛-inch thickness and 6" length, or other conventional mounting hardware) that are in turn mounted in place (for example by welds) to the curtain wall 308/508 and (for example by bolts) to the chamber rear wall 16 and the chamber side walls 18 and 20 with a sealing (for example caulk). Alternatively, the container support 406 can be mounted in place by other conventional techniques well-known in the art such as by direct welding or bolting. In typical commercial embodiments, the angle pieces of the container support 406 are provided in a range of sizes for use in a range of sizes of filter container 402, such as 2', 2.5', and 3' long angle pieces for configuring in confirming sizes to the typical filter-container sizes listed above. In other embodiments, the container support is mounted to the chamber by being supported upon the chamber floor or suspended from above.

One peripheral-frame container support 406 is provided for each filter container 402, so in the depicted embodiment with two filter containers there are two peripheral-frame container supports. In some embodiments with multiple filter containers, one combination container support is provided that includes multiple sub-combination container supports each for one of the filter containers, so these components should not be construed in an unnecessarily limiting way to require a one-to-one correlation. In other embodiments, each container support is provided by a plurality of tabs, pins, bars, or other projections extending inward from the chamber rear wall, the chamber side walls, and/or the curtain wall for supporting (but not extending peripherally around) one of the filter containers above the chamber floor 22.

In addition, the seal 408 of the depicted embodiment is provided by a peripheral strip of resilient non-porous gasket material that substantially prevents water flow through it to form a seal between the filter container 402 and the container support 406. The seal 408 can be attached to the top surface of the container support 406 (as depicted) or to the bottom peripheral edges of the filter container 402. In other embodiments, the seal is provided by a bead, flange, or coating of rubber or another water-sealing material positioned between the filter container and the container support and extending peripherally around the filter container to prevent the water from flowing around the filter container and thereby bypassing the filters.

The filters 404 can be provided by conventional flat filter panels that are sized and shaped to fit within the filter container 402 lying generally horizontally flat in a stacked arrangement, as depicted. The filters 404 are replaceable and can be inserted and removed through the open top 413 of the filter container 402. Typically the filters 404 are provided by the filter media alone, without a structural frame, so they are flexible and supported in the filter container 402 by a bottom filter support 412 in the form of for example a mesh cover panel (as depicted). Alternatively, the filters can include rigid or semi-rigid structural frames (e.g., peripheral frames) for support, optionally including integral spacers to maintain a predetermined vertical separation between the stacked filters, with such embodiments useable with a bottom filter support 412 in form of for example a peripheral frame or a mesh cover panel. In some embodiments, the filter container includes vertically-spaced horizontal channels for receiving, positioning (spacing), and at least partially supporting the filters. And in other embodiments, instead of the stacked filters, the filter container includes one or more flapper filters for example of the type disclosed in U.S. Pat. No. 6,936,163.

The filter media 404 can be selectively stacked in a specific arrangement (i.e., type, number, and sequence) to provide a desired filtration functionality for intelligently selected sequential treatment given the site conditions. In the depicted embodiment, as just one of many example filter arrangements, a first/bottom filter media is a coconut fiber, a second/intermediate filter media is an X-TEX fabric (a felt-like, non-woven fabric that has excellent hydrocarbon removal attributes as well as heavy-metal removal abilities), and a third/top filter media is an X-TEX fabric. In another example filter arrangement, a first/bottom filter media includes a coconut fiber and an X-TEX fabric, a second/lower-intermediate filter media includes perlite, a third/upper-intermediate filter media includes granular activated carbon, and a fourth/top filter media includes organically modified zeolite. The X-TEC fabric can be made into a jacket holding another filter media or otherwise provided on both major sides of another filter media to form a single filter media, or it can be provided on only one of the major sides of another filter media to form a single filter media, with the other filter media being for example a perlite, zeolite, activated carbon, or PATHSHIELD media.

Figure 12:
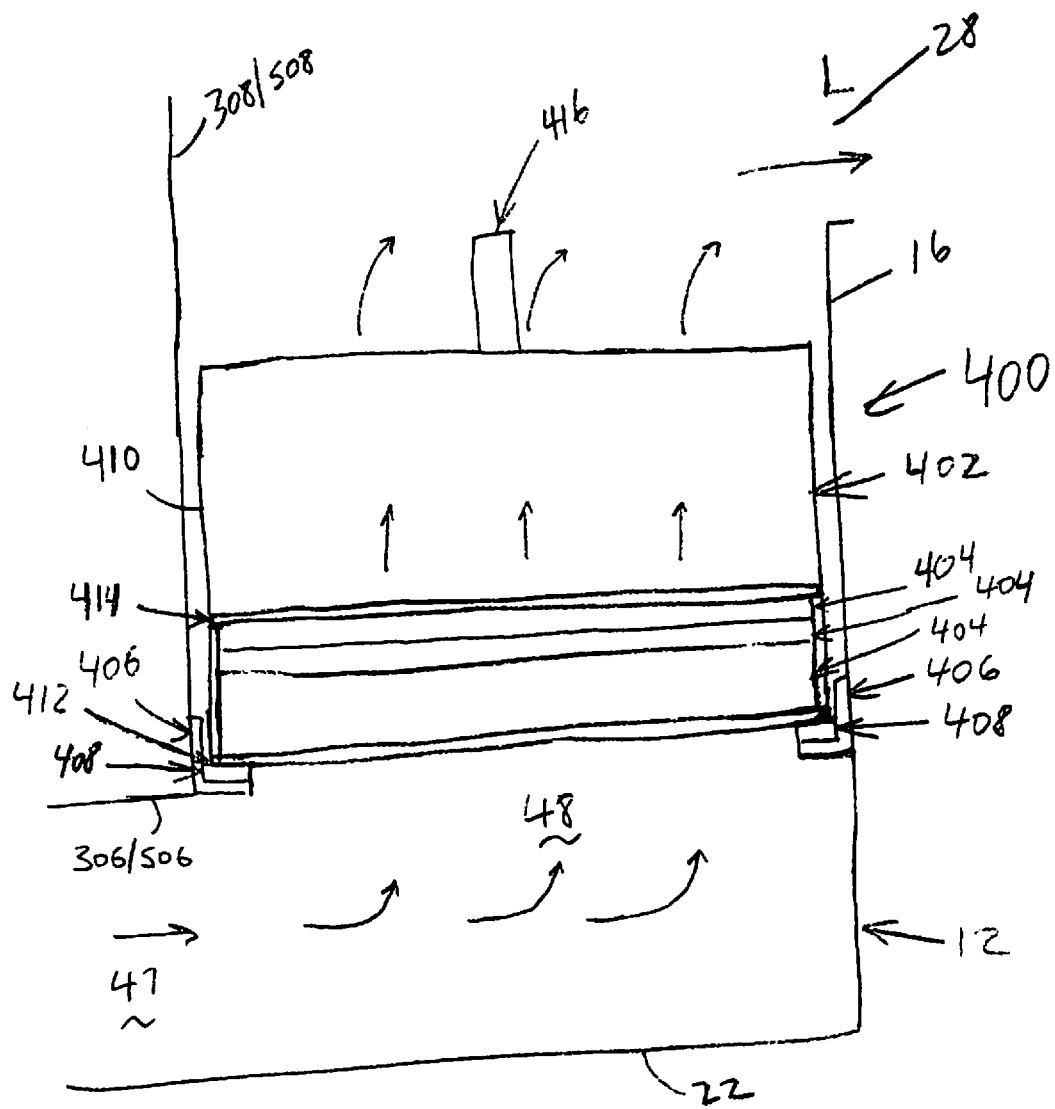
FIG. 12 shows the pollution trap portion of FIG. 6 in use with water flowing up through the filter container and the filters.

Having described details of the construction of the filter box 400, its function and use will now be detailed. FIG. 12 shows the filter box 400 in use. The water flows (as depicted by the directional arrows) horizontally from the bottom-flow gap 47 into the rear sub-chamber 48, then up through the filter container 402 and up across the stacked filters 404, then horizontally out of the chamber outlet 28. The filter container 402 is supported in place above the chamber floor 22 by the container support 406 to enable the water to flow upward through the filter container and across the filters 404. And the seal 408 between the filter container 402 and the container support 406 prevents the water from flowing around the filter container and bypassing the filters 404.

Figure 13:
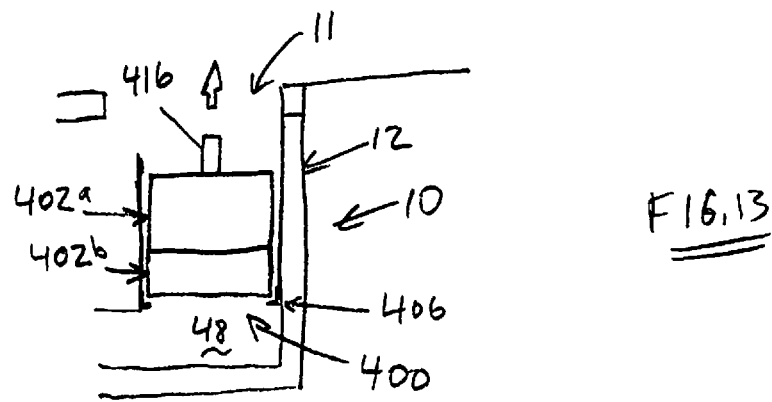
FIG. 13 shows the pollution trap portion of FIG. 12 with a first filter container being lifted in the trap for removal through its top opening in a step of a top-down cleaning procedure.
Figure 14:
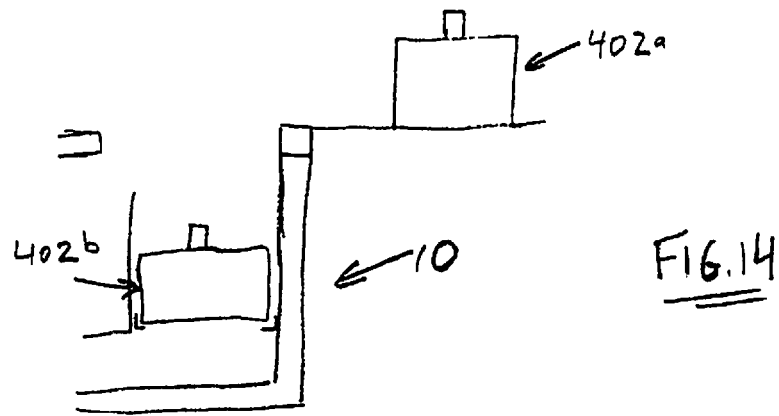
FIG. 14 shows the pollution trap portion of FIG. 13 with the first filter container completely removed from the trap through its top opening in a next step of the top-down cleaning procedure.
Figure 15:
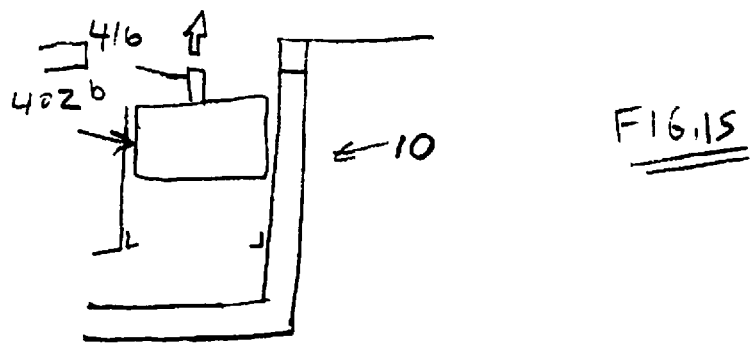
FIG. 15 shows the pollution trap portion of FIG. 14 with a second filter container being lifted in the trap for removal through its top opening in a next step of the top-down cleaning procedure.
Figure 31:
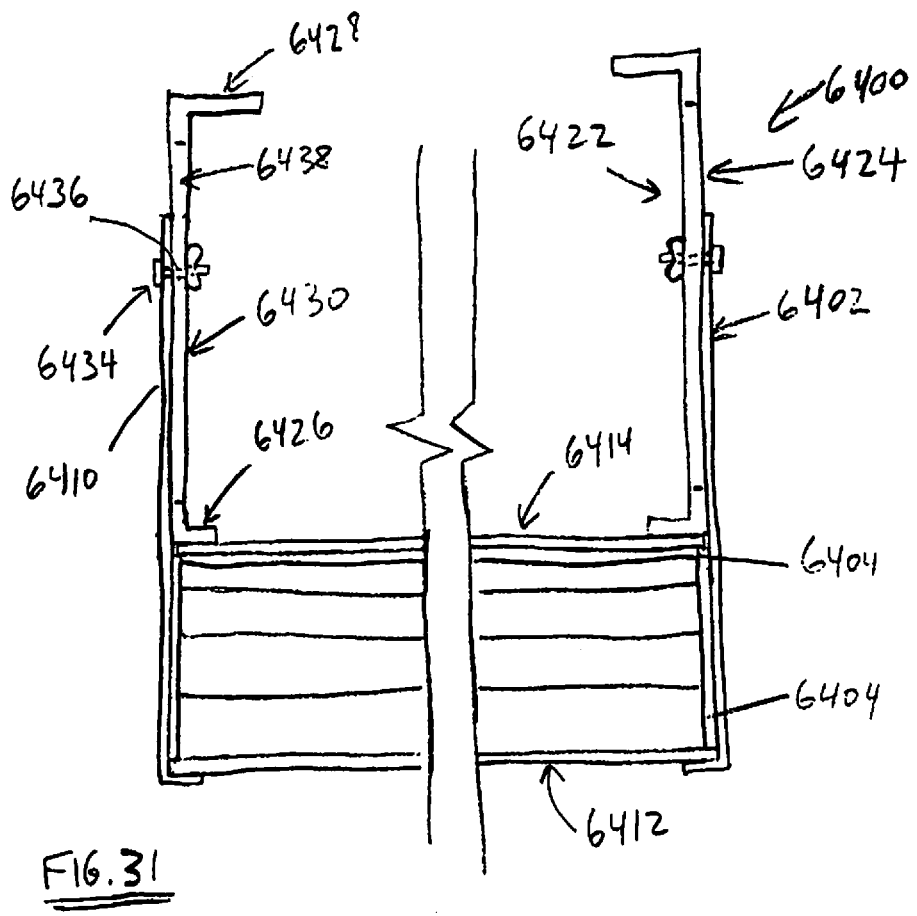
FIG. 31 is a cross-sectional side view of the filter container of FIG. 28, showing the hold-down assembly in use to hold the filters in place.
Figure 32:
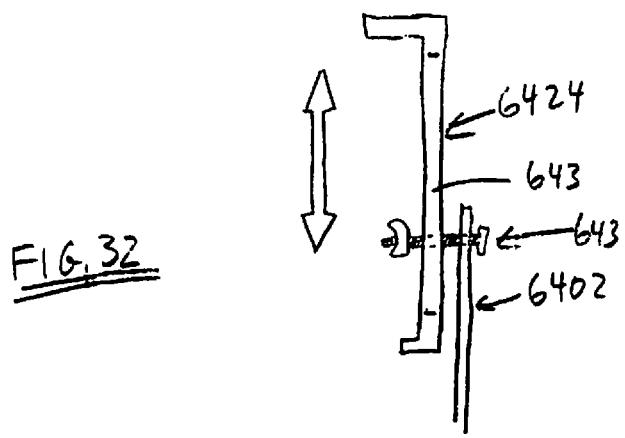
FIG. 32 is a detail side view of a portion of the filter container of FIG. 28, showing the adjustability of the hold-down assembly.

FIGS. 13-15 show a maintenance procedure for a pollution trap 10 with a filter-box assembly 400 including two filter containers 402a and 402b (collectively, the filter containers 402) in a lateral/side-by-side arrangement. In the maintenance procedure, the two filter containers 402 are removed from the trap 10, their existing/used filters 404 are replaced (by installing fresh or cleaned filters), and the renewed filter containers are reinserted back into the trap for use. In FIG. 13, a first filter container 402a is being lifted (as indicated by the directional arrow) from above by its handle 416 upward within the chamber 12 for removal through its top opening 11 (e.g., through conformingly shaped and sized manhole access-hatch opening 11b) in a top-down cleaning fashion. In FIG. 14, the first filter container 402a has been removed and placed on the ground beside the trap 10, and a second filter container 402b remains in the chamber 12. And in FIG. 15, the second filter container 402b is being lifted (as indicated by the directional arrow) from above by its handle 416 upward within the chamber 12 for removal through its top opening 11 (e.g., through conformingly shaped and sized manhole access-hatch opening 11b) in a top-down cleaning fashion. The top filter retainers 414 can then be moved from the constraining position to the displaced position, the filters 404 replaced, including rearranged (i.e., type, number, and sequence), in the filter containers 402, and the top filter retainers returned to the constraining position. Finally, the filter containers 402 can then be lowered back into the chamber 12 through its top opening 11, by reversing the steps of FIGS. 13-15, for subsequent use to separate additional pollutants from the storm-water. Alternatively, the filter containers 402 can be lifted and held in place (completely removed from or with their lower ends still within the chamber), for example by mechanical devices, during rearrangement of the filters 404.

In this way, the filter containers 402 can be removed and replaced from above by a maintenance person at ground level without having to physically enter the chamber 12, except to reach an arm into the chamber through its top opening 11 (e.g., through conformingly shaped and sized manhole access-hatch opening 11b) to grasp the handle 416 (for manual removal and replacement) or to attach a line to the handle (for mechanical removal and replacement). As such, the pollution trap 10 (with its top opening 11) and the filter box assembly 400 (with its handled containers 402, filter-container support 406, and seal 408) provides for top-down cleaning in a simpler, quicker, and easier fashion during maintenance of the trap 10.

In addition, the arrangement (i.e., type, number, and sequence) of the filters 404 can be tailored specifically to site conditions initially, and then modified later when the initial installation actual site conditions become better-known or changed. Specific examples of some types, numbers, and sequences of the filter media 404 that are typically used with the filter-box assembly 400 are described in detail above. In this way, the trap 10 and filter-box assembly 400 of this embodiment provide for intelligently selected sequential treatment for more-sensitive and site-specific filtration. As such, reference herein to "replacing" the filters is intended to mean not just removing existing filters and replacing them with new or cleaned filters of the same type, number, and sequence, but also includes rearranging the filters as described herein.

With respect to rearranging the filters 404 once the actual site conditions are better-known based on field results, further explanation will be provided. Prior to operation of a trap 10, there is no data on exactly what will wash off of a specific site and thus need to be treated. The present invention allows for rearranging the filters 404 by (1) adding an additional filter of the same or a different type, (2) removing an existing filter, (3) substituting in a different type of filter for a removed filter, and/or re-sequencing the filters. For example, if a new, improved filter medium becomes available after the trap is in operation, the filters can be rearranged by (1) adding or (3) substituting in the new filter in the same or a (4) new sequence, in order to take advantage of the improved filter capability. If the site conditions change due to the site being converted from usage as a vehicle fuel station to a fast-food restaurant, the filters can be rearranged by (1) adding, (2) removing, or (3) substituting one or more filters in the same or a (4) new sequence, in order to deal with the different pollutants being produced. Or if the site conditions change over seasons and/or due to unexpected/unusual weather, the filters can be rearranged by (1) adding, (2) removing, or (3) substituting one or more filters in the same or a (4) new sequence, in order to seasonally or temporarily deal with the different pollutants being produced. Furthermore, some filter media work very well initially, but are quickly "blinded" by certain pollutants in the storm-water (e.g., oil or fine clay), and the filters can be rearranged by (4) re-sequencing the filters to specifically target certain pollutants earlier in the flow-path so they do not degrade the effectiveness of filters placed later in the flow-path. As can be seen, the intelligent filter-arrangement capability includes the initial arrangement and the later rearrangement of filters in the same trap without adding any additional traps and/or without removing the initial trap.

FIGS. 16-20 show a pollution trap 1010 with a filter box assembly 1400 according to a second example embodiment of the invention. The trap 1010 of this embodiment is substantially similar to the trap 10 and filter box assembly 400 of the first embodiment. In this embodiment, however, the filter box assembly 1400 includes four filter containers 1402 and four container supports 1406. The four filter containers 1402 and four container supports 1406 are arranged two abreast (side-by-side) and two deep (front-to-back), though in other embodiments they are four abreast or four deep. And at least one support post 1418 (e.g., a metal rod, bar, wall, frame, or other structural support member) extends generally vertically between the chamber floor 1022 and the container supports 1406 (e.g., one support post at a location generally central to the four container supports, as depicted) to support the container supports and thus the filter containers. The support post 1418 can be attached to the chamber floor 1022 or to one or more of the container supports 1406. In other embodiments there are multiple support posts, for example one for every one or two filter containers and container supports, or multiple ones for each filter container and container support.

FIG. 21 shows a filter container 2402 of a filter box assembly of a pollution trap according to a third example embodiment of the invention. In this embodiment, filter spacers 2420 are positioned between the stacked filters 2404 to at least partially support the upper-positioned filter(s) to thereby reduce weight compression of the lower-positioned filter(s). The spacers 2420 can be provided by for example peripheral frames (defining flow-through center openings), a plurality of spacer members (e.g., discs, blocks, slabs, or bosses) positioned along the periphery of the filters 2404 (defining flow-through center openings), mesh/screen/grate panels (with perforations defining flow-through openings), or other conventional structural members that maintain a spacing between the vertically stacked filters while defining at least one flow-through opening permitting storm-water up-flow therethrough).

FIG. 22 shows a pollution trap 3010 with a filter box assembly 3400 according to a fourth example embodiment of the invention. In this embodiment, a filter-box bypass 3500 extends laterally all the way across the chamber 3512 to by itself define the curtain wall 3508 and the gap edge 3506 and to define the rear sub-chamber 3548. Additional filtration stages, such as one or more of those described herein and/or one or more other filter stages not described herein, can be included in the trap and configured to at least partially define the curtain wall, the gap edge, and/or the rear sub-chamber.

FIG. 23 shows a pollution trap 4010 with a filter box assembly 4400 according to a fifth example embodiment of the invention. In this embodiment, the curtain wall 4508 extending laterally across the chamber 4512 is not defined by a portion of a filter-box bypass or a collection reservoir, but instead is provided for the sole purpose of defining the bottom-flow gap 4547 and the rear sub-chamber 4548. In other embodiments, the curtain wall is at least partially defined by a rear wall of a different filter stage not disclosed herein.

In other embodiments, the curtain wall does not extend laterally all the way across chamber and instead the front sidewall of the filter container when installed in the chamber at least partially defines the rear sub-chamber (and thus serves as the remaining portion of the curtain wall). And in such embodiments, the front sidewall of the filter container (when installed in the chamber) can at least partially define the gap edge (and thus the bottom-flow gap and the rear sub-chamber), with a separate curtain wall (separate from the filter container) not provided. In yet other embodiments, the curtain wall is not a separate structure and instead is defined by the front wall of the filter container.

FIG. 24 shows a pollution trap 5010 with a filter box assembly 5400 according to a sixth example embodiment of the invention. In this embodiment, the open bottom 5411 of the filter container 5402 is formed in the lower portion of its front sidewall 5410 (instead of its true/horizontal bottom, but still above the chamber floor), the filter container is supported by the chamber floor 5412 (so dedicated/separate container supports are not needed, and instead the container support is defined by at least a portion of the peripheral wall of the container extending below the bottom opening and mounted to the chamber by being supported by the chamber floor), the filters 5404 are supported in the filter container by a bottom cover support 5412 (mounted within the filter container), and the seal 5406 is located between the filter container front sidewall and the chamber curtain wall 5508 and between a filter container bottom wall and the chamber floor 5022 (to prevent water flowing around the filter container).

FIGS. 25-32 show a filter container 6402 of a filter box assembly 6400 according to a seventh example embodiment of the invention. In this embodiment, the bottom filter support 6414 of the filter container 6402 includes a mesh cover panel 6414a and a peripheral support frame 6414b that supports the mesh cover panel without obstructing storm-water flow through the supported filters 6404. In addition, the bottom filter support 6414 can include at least one non-peripheral support brace 6414c, for example extending across a mid-section of the mesh cover panel 6414a between long sides of the peripheral support frame 6414b. The mesh cover panel 6414a can be provided by for example a grate or screen made of for example ¾" aluminum attached to the filter container 6402 by for example welding, or it can be made using other structures, materials, and attachments. The peripheral support frame 6414b and the support brace 6414c can be provided by for example angle pieces made of for example 1" wide and 0.125" thick aluminum attached to each other and the mesh cover panel 6414a by for example welding, or it can be made using other structures, materials, and attachments. It should be noted that the bottom filter support 6412 can be installed into and removed from the filter container 6402 (i.e., repositioned between its displaced/maintenance position and its constraining/use position) by angling the bottom filter support and sliding it under the handle 6416 from either side and into or out of the filter container (the vertical installation suggested by FIG. 25 is for general illustration purposes only).

In addition, this embodiment includes an adjustable hold-down assembly 6422. Typically, the hold-down assembly 6422 is used in combination with the top filter retainer 6414, though in some applications it is used instead of (without) the top filter retainer. The hold-down assembly 6422 includes at least one hold-down member 6424 that is adjustable to define a series of vertical positions above the bottom filter support 6412. The hold-down member 6424 can be selectively positioned based on the collective height (thickness) of the filters 6404 (and the top filter retainer 6414). In some positions, the hold-down member 6424 is pressed down against and abutting the top filter retainer 6414 (or the top-most filter 6404) to maintain the filters in flush contact with each other. And in some other positions, the hold-down member 6424 is spaced above the top filter retainer 6414 (or the top-most filter 6404) to permit a predetermined amount of separation between the filters (as they may tend to float it the storm-water) to increase the permittivity (without permitting the filters to float freely and become angled so much that the storm-water can freely up-flow around them).

In the depicted embodiment, the hold-down member 6424 is vertically elongate and includes a lower foot section 6426, an upper handle section 6428, and a connecting section 6430 extending vertically between them. The lower foot section 6426 blocks the top filter retainer 6414 (or the top-most filter 6404) from moving upward past it and as such is a mechanical stop that holds the filters down in place within the filter container 6402. The upper handle section 6428 can be pushed down on or pulled up on to lower or raise, respectively, the hold-down foot 6426. The hold-down member 6424 can be made of for example 0.25" thick and 1" wide aluminum bar stock, with the foot 6426 about 1" long, the handle 6428 about 3" long, and the connecting section 6430 about 1' long. Typically, each filter container 6402 has two of the hold-down members 6424 positioned oppositely from each other (e.g., at shorter-length sidewalls, as depicted).

Figure 34:
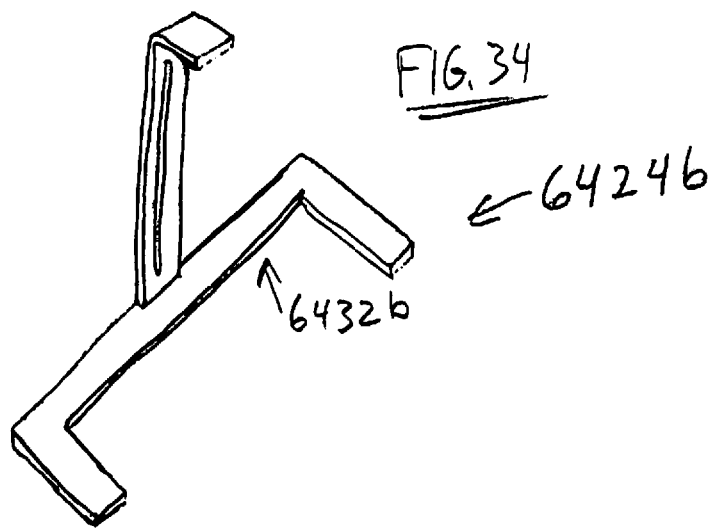
FIG. 34 is a perspective view of a hold-down member of another alternative embodiment.
Figure 33:
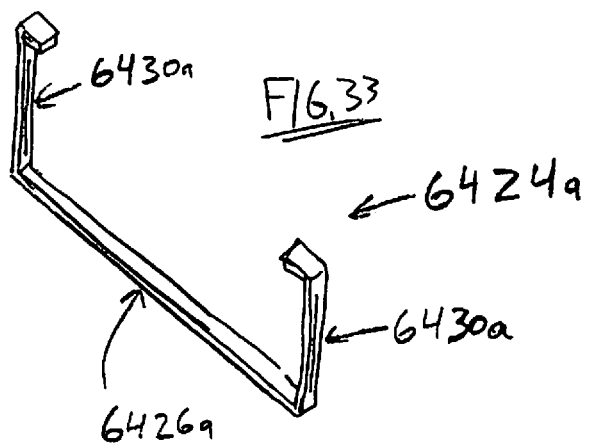
FIG. 33 is a perspective view of a hold-down member of an alternative embodiment.

In other embodiments, the handles of the hold-down members are in the form of a T-member, C-member, loop, knob, or other structure that can be manipulated by lifting or lowering to vertically adjust the position of the hold-down members. In still other embodiments, the feet are in the form of a plate, ball, perforated panel, mesh sheet, or other structure that can abut against the top filter retainer 6414 (or the top-most filter 6404) and block it from moving upward (without substantially obstructing storm-water flow). In yet other embodiments, one foot 6426a extends between two connecting sections 6430a and across the top filter retainer to collectively form one hold-down member 6424a (see FIG. 33). In yet still other embodiments, the feet 6426b include transverse wings 6432b that extend along at least a portion of the periphery of the top filter retainer (see FIG. 34). Also, the hold-down members can be located at corners (e.g., two or four) of the filter container, they can be positioned extending across the filter container (e.g., over the mid-section brace support), or they can be at least partially recessed into channels in the filter container sidewalls (e.g., with recessed connecting sections and with feet pivotal between an unfolded/horizontal use position and a folded/vertical stored position). It will be understood that the hold-down members can be provided in these or other forms, for positioning in these or other locations of the filter container, as is understood by persons of ordinary skill in the art to produce the functionality described herein.

As noted above, an adjustability system is provided so that the hold-down members 6424 can be set with their feet 6426 at serial vertical positions. In the depicted embodiment, this adjustability is provided by a fastener (e.g., a nut and bolt) 6434, a hole 6436 in one of the sidewalls 6410 of the filter container 6402, and a slot 6438 in the hold-down member 6424. The hold-down member 6424 is positioned within the filter container 6402 with a portion of its slot 6438 aligned with the container hole 6436, the fastener 6434 is inserted through the aligned openings, the handle 6428 is manipulated to position the foot 6426 in the desired location, and the fastener is tightened to lock the hold-down member in place. But with the fastener 6434 loosened, hold-down member 6424 can be raised or lowered, with the fastener riding within its slot 6438 to retain the hold-down member from removal from the filter container 6402 (see FIG. 32). In this way, the adjustment system permits the hold-down assembly 6422 to be set at different serial vertical positions, lower to accommodate fewer or thinner filters 6404, or higher to accommodate more and/or thicker filters.

In other embodiments, the adjustability system includes a gear-set (e.g., rack and pinion gears) for vertical motion and positioning of the hold-down member, a threaded hold-down member that engages mating threads of the filter container so that when rotated it raises or lowers, two vertical telescopic segments of a hold-down member with locking pins selectively positionable in alignable through-holes, or a guide track and a spring that biases the hold-down member feet downward along the guide track. In still other embodiments, the adjustability system includes a series of vertically-spaced notches in the filter-container sidewalls that the hold-down feet (or another portion of the hold-down members) can be received into (e.g., snap-fit) to hold them in place, or such hold-down feet can be pivotally mounted to the filter container and pivotal between an unfolded/horizontal use position and a folded/vertical stored position, with such hold-down members including the feet by not the handles or connecting sections. It will be understood that the adjustability system can be provided in these or other forms as is understood by persons of ordinary skill in the art to produce the functionality described herein.

In other embodiments, the filter box assembly is not positioned at the rear of the chamber, and instead another filter stage is positioned behind it. In such embodiments, the filter box assembly is positioned in a front, intermediate, or other sub-chamber of the trap. And in yet other embodiments, an external (outside the chamber) filter stage is provided and the filters in the chamber are arranged for targeting specific pollutants (e.g., bacteria or phosphorus).

It should be noted that in all of the depicted the embodiments the bottom filter support is horizontally arranged to support the filters in a horizontal position, with the top filter retainers also horizontally arranged. In other embodiments the bottom filter support is angled from horizontal, for e.g. about 5 degrees to about 20 degrees from horizontal and typically no more than about 45 degrees from horizontal, with the filters supported in the same angled position. This can be desirable to increase the effective filtration surface area through which the storm-water flows while still providing an up-flow through the filter container. As such, the terms "horizontal" and "flat" as used herein are not intended to mean absolutely horizontal and flat but instead mean horizontally enough that storm-water up-flow through the filters is practical and effective.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A trap using filters to separate pollution from water, the trap comprising:
   a chamber including a floor, front and rear walls, two opposing side walls, a front inlet, and a rear outlet, wherein the water flows through the chamber from the front inlet to the rear outlet;
   a curtain wall that is positioned in the chamber, cooperates with the side walls to at least partially define a sub-chamber, and has a bottom that cooperates with the floor and the side walls to define a bottom-flow gap;
   a container adapted to hold one or more filters, having a peripheral wall defining an open bottom and an open top, and removably positioned in the sub-chamber in a use position with the container open bottom a predetermined distance above the chamber floor to allow space for the pollution to settle, wherein the open bottom and the open top of the filter container permit upflow therethrough when the filter container is in the use position to enable the water to flow from the bottom-flow gap, into the rear sub-chamber, up through the container and up across the filters, and out of the sub-chamber;
   a container support for the filter container, wherein the container support is mounted to the chamber to support the filter container in the use position; and
   a seal interposed between the filter container and the container support, wherein the seal is adapted to prevent the water from flowing around the filter container and bypassing the filters, wherein the water flowing through the trap is forced upward through the filter container so that it flows across the filters, decelerates, and has an increased residence time in the chamber, collectively providing for an increased separation efficiency of the trap, further comprising a collection reservoir and a filter-box bypass, each having a respective rear wall, wherein the curtain wall is defined by the respective rear walls of the collection reservoir and the filter-box bypass.

2. The water pollution trap of claim 1, wherein the chamber includes a top access opening and the filter container fits through the top access opening so that the filter container can be removed from the sub-chamber from above to replace the filters.

3. The water pollution trap of claim 2, wherein the filter container includes a handle that can be grasped to lift the filter container up out of the sub-chamber from above to replace the filters.

4. The water pollution trap of claim 1, wherein the filter container includes a bottom filter support having at least one flow-through opening and a top filter retainer having at least one flow-through opening and positioned above the bottom filter support, wherein the bottom filter support and the top filter retainer sandwich the filters between them and retain the filters within the filter container during use while permitting the water flow up through the flow-through openings and thus across the filters.

5. The water pollution trap of claim 4, wherein the top filter retainer is removable from the filter container to replace the filters.

6. The water pollution trap of claim 1, wherein the container support includes a peripheral frame mounted to and extending inward from the curtain wall, the chamber rear wall, or the chamber side walls, or a combination thereof.

7. The water pollution trap of claim 1, wherein the seal includes a peripheral strip of gasket material.

8. The water pollution trap of claim 1, comprising two or more of the filter containers in the sub-chamber in a side-by-side arrangement, in a front-to-back arrangement, or a combination thereof.

9. The water pollution trap of claim 1, wherein the filter container is adapted to receive and hold the filters when laying generally horizontal and in a stacked arrangement.

10. The water pollution trap of claim 1, wherein the chamber rear wall cooperates with the curtain wall and the chamber side walls to define the sub-chamber.

11. The water pollution trap of claim 1, wherein the filter-box bypass includes a lower front bypass inlet, an upper rear bypass outlet, and a generally vertical bypass passageway extending between the bypass inlet and the bypass outlet.

12. The water pollution trap of claim 1, wherein the chamber inlet has a cross-sectional area in a plane perpendicular to the water flow therethrough, and the sub-chamber has a cross-sectional area in a plane perpendicular to the water flow therethrough that is larger than the inlet cross-sectional area.

13. The water pollution trap of claim 1, wherein the chamber inlet has a cross-sectional area in a plane perpendicular to the water flow therethrough, and the bottom-flow gap has a cross-sectional area in a plane perpendicular to the water flow therethrough that is larger than the inlet cross-sectional area.

14. The water pollution trap of claim 1, further comprising at least one support post extending generally vertically between the chamber floor and the container support.

15. The water pollution trap of claim 1, further comprising at least one filter spacer interposed between two of the filters to at least partially support an upper-positioned one of the filters to thereby reduce compression of a lower-positioned of the filters.

16. The water pollution trap of claim 1, wherein the open bottom of the filter container is at least partially formed in the peripheral wall of the filter container and the container support is provided by portions of the container peripheral wall extending below the open bottom that are mounted to the chamber by being supported by the chamber floor.

17. The water pollution trap of claim 1, further comprising a filter top retainer and at least one adjustable hold-down assembly that includes at least one hold-down member that is adjustable between a series of vertical positions to retain the filter top retainer in place.

18. A method of maintaining the water pollution trap of claim 1, comprising the steps of:
lifting the filter container from above up and out of the chamber;
replacing at least one of the filters in the filter container; and
lowering the filter container from above down into the chamber until the filter container is supported by the container support in the use position.

19. The maintenance method of claim 18, wherein the step of replacing the filters includes rearranging the filters to provide intelligent sequential treatment tailored to actual site conditions.

* * * * *